(12) United States Patent
Pursifull (10) Patent No.: US 11,142,040 B2
(45) Date of Patent: Oct. 12, 2021

(54) METHOD AND SYSTEM FOR HEATING VEHICLE CABIN WITH WATER-COOLED ALTERNATOR

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 365 days.

(21) Appl. No.: 16/132,063

(22) Filed: Sep. 14, 2018

(65) Prior Publication Data

US 2020/0086715 A1    Mar. 19, 2020

(51) Int. Cl.
| | | |
|---|---|---|
| *B60H 1/14* | (2006.01) | |
| *B60H 1/00* | (2006.01) | |
| *H02J 7/16* | (2006.01) | |
| *B60H 1/03* | (2006.01) | |

(52) U.S. Cl.
CPC ......... *B60H 1/143* (2013.01); *B60H 1/00885* (2013.01); *B60H 1/03* (2013.01); *H02J 7/16* (2013.01); *B60H 2001/00928* (2013.01)

(58) Field of Classification Search
CPC .......... B60H 1/143; B60H 1/03; B60H 1/025; B60H 1/00314; B60H 1/00885; B60H 2001/00928; H02J 7/16
USPC ...................................... 237/12.3 B
See application file for complete search history.

(56) References Cited

U.S. PATENT DOCUMENTS

| | | | |
|---|---|---|---|
| 3,576,970 A | 5/1971 | Cherry | |
| 3,585,358 A | 6/1971 | Nilssen | |
| 3,984,750 A * | 10/1976 | Pfeffer | ................. H02J 7/1484 |
| | | | 363/67 |
| 4,188,527 A | 2/1980 | Follmer | |
| 4,500,772 A | 2/1985 | Ahner et al. | |
| 5,683,031 A | 11/1997 | Sanger | |
| 7,509,929 B2 | 3/2009 | Kurple | |
| 9,694,649 B2 | 7/2017 | Seiler et al. | |

(Continued)

FOREIGN PATENT DOCUMENTS

| | | |
|---|---|---|
| JP | H105312029 A | 11/1993 |
| JP | 3972499 B2 | 9/2007 |

(Continued)

OTHER PUBLICATIONS

Markus, F., "Webasto Liquid Heat Generator," Motortrend Website, Available Online at https://www.motortrend.com/news/webasto-liquid-heat-generator-1687/, Mar. 5, 2008, 2 pages.

(Continued)

*Primary Examiner* — Kenneth J Hansen
*Assistant Examiner* — John E Bargero
(74) *Attorney, Agent, or Firm* — Geoffrey Brumbaugh; McCoy Russell LLP (57) ABSTRACT

Methods and systems are provided for heating a cabin of a vehicle using an alternator of the vehicle. In one example, a method may include operating in a first operating mode to heat a cabin of a vehicle, the first operating mode including shorting an alternator output of an alternator of the vehicle to ground, and closing a coolant valve positioned between a coolant system of an engine of the vehicle and an alternator coolant circuit.

18 Claims, 4 Drawing Sheets

(56) References Cited

U.S. PATENT DOCUMENTS

2014/0136087 A1    5/2014  Kamatani
2016/0169081 A1*   6/2016  Hosokawa ................ F01P 7/16
                                                    123/41.08

FOREIGN PATENT DOCUMENTS

JP        2007245753 A    9/2007
KR         101186051 B1   9/2012

OTHER PUBLICATIONS

"Rapid Defrost & Cabin WarmUp—Ventech Idle Reduction Technology," YouTube Website, Available Online at https://www.youtube.com/watch?v=hA2bPKRsjG0, Dec. 13, 2011, 3 pages.

* cited by examiner

METHOD AND SYSTEM FOR HEATING VEHICLE CABIN WITH WATER-COOLED ALTERNATOR

FIELD

The present description relates generally to methods and systems for controlling a vehicle alternator to provide heat for heating a vehicle cabin.

BACKGROUND/SUMMARY

Vehicle cabin temperatures are often controllable using air conditioning/heating systems that provide temperature-controlled air flow through one or more dashboard vents. Air conditioning systems may leverage the operation of a compression system in the vehicle to generate and flow cold air through the dashboard vents substantially instantly responsive to a request for the cold air. However, vehicle heating systems typically utilize heat from an engine and related systems of the vehicle to generate hot air for the cabin. Accordingly, air flowing through the dashboard vents is slow to heat following a cold start of the engine, as the engine and other components take time to warm up to a temperature that is capable of heating coolant and thus the cabin effectively.

Other attempts to address the availability of hot cabin air may include utilizing electrical sources of conventional vehicles (e.g., vehicles that utilize 12 volt outputs from an associated alternator/rectifier to power electrical components) to output to an electrical resistance heater. However, the inventors herein have recognized potential issues with such systems. As one example, the output of sufficient power to operate a heater (e.g., 5 kilowatts) using such a low voltage supply results in exceptionally large currents (e.g., 400 amps). Accordingly, although all other vehicle operation would be able to be handled by an alternator with a lower current limit (e.g., a 250 amp limit), a more costly alternator would be employed to handle the large currents of the above approach. Furthermore, utilizing alternator output to power an electric heater may be subject to efficiency losses in the operation of the alternator. The above approach also fails to account for heat losses in the coolant circuit of the heater, as coolant from the heater core of a cabin heater may be routed to warm the engine during a warm-up phase as well. This common practice spends some of the heat energy on warming the engine/transmission instead of prioritizing the heater core.

In one example, the issues described above may be addressed by a method for supplying heat to a vehicle cabin (e.g., following an engine cold start), the method including operating in a first operating mode to heat a cabin of a vehicle, the first operating mode including shorting an alternator output of an alternator of the vehicle to ground, and closing a coolant valve positioned between a coolant system of an engine of the vehicle and an alternator coolant circuit, the alternator coolant circuit flowing coolant heated by the alternator to a heater core of a cabin heater of the vehicle. In this way, substantially all of the output of the alternator may be provided as heat provided directly to the heater core in order to provide fast, efficient heating of the vehicle cabin, even when other heat-generating components of the vehicle (e.g., the engine) are still warming.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
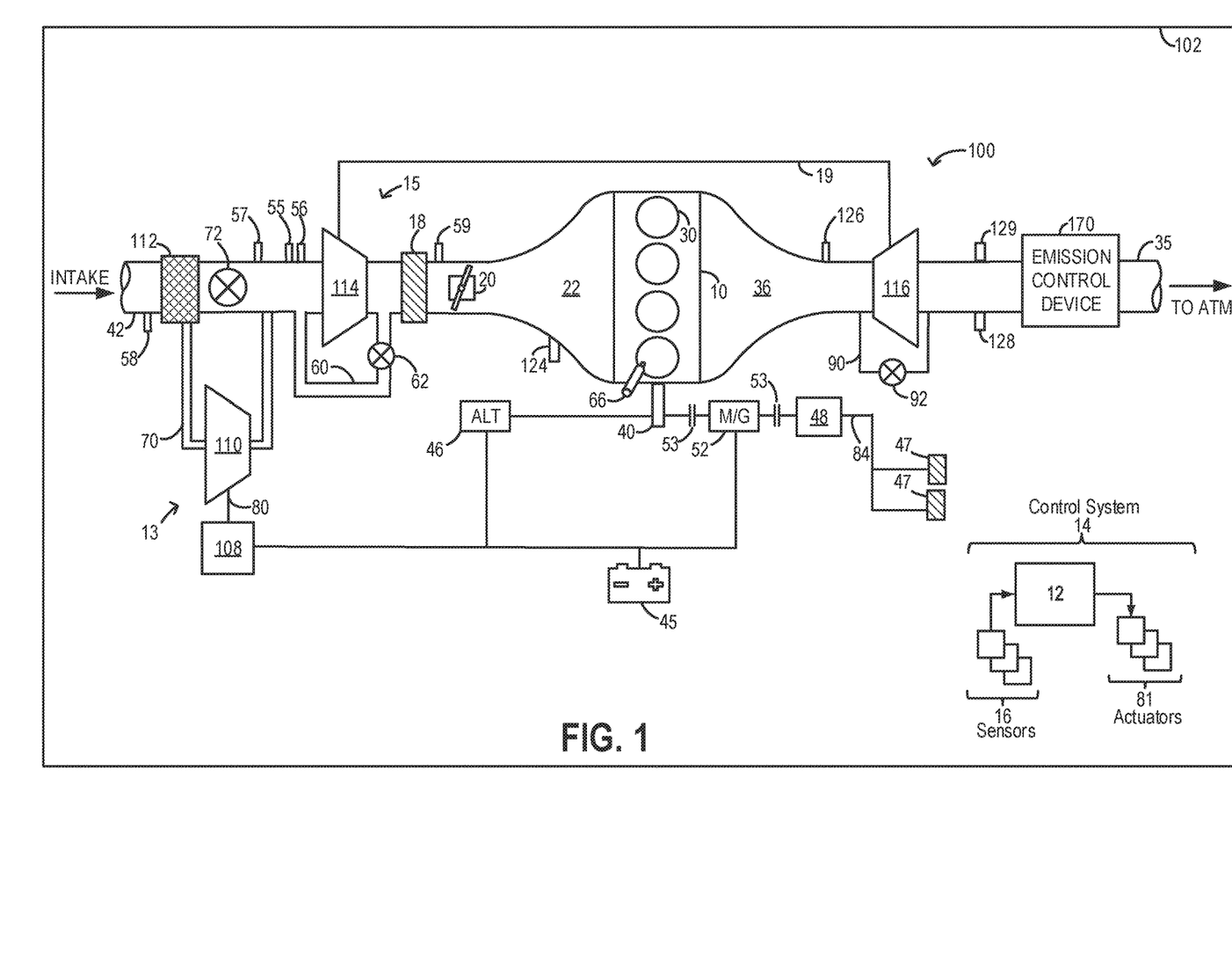
FIG. 1 shows an example embodiment of an engine system.
Figure 2:
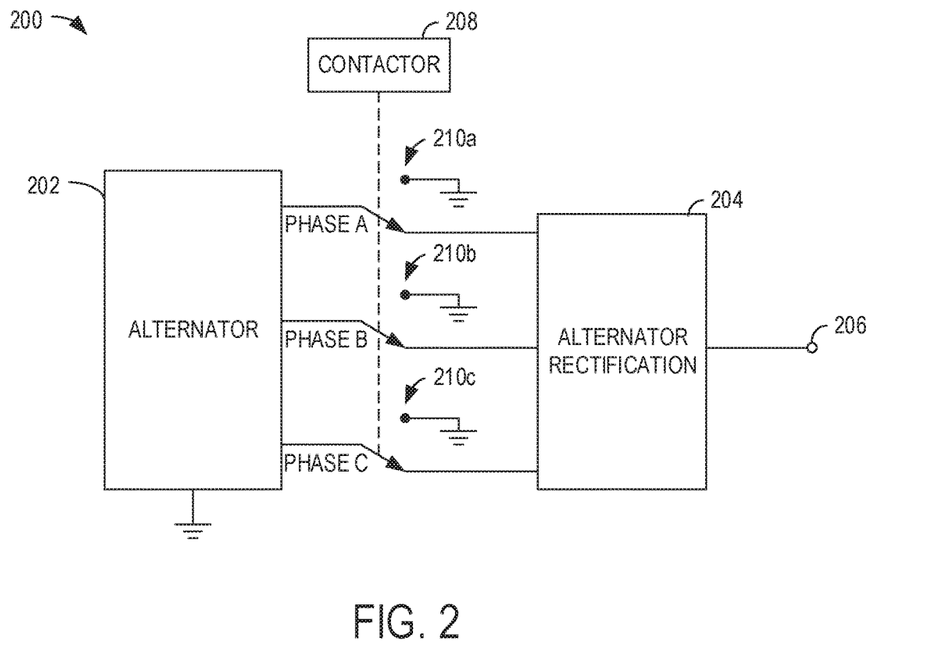
FIG. 2 schematically shows an example alternator of an engine system and associated electrical connections of the alternator.
Figure 3:
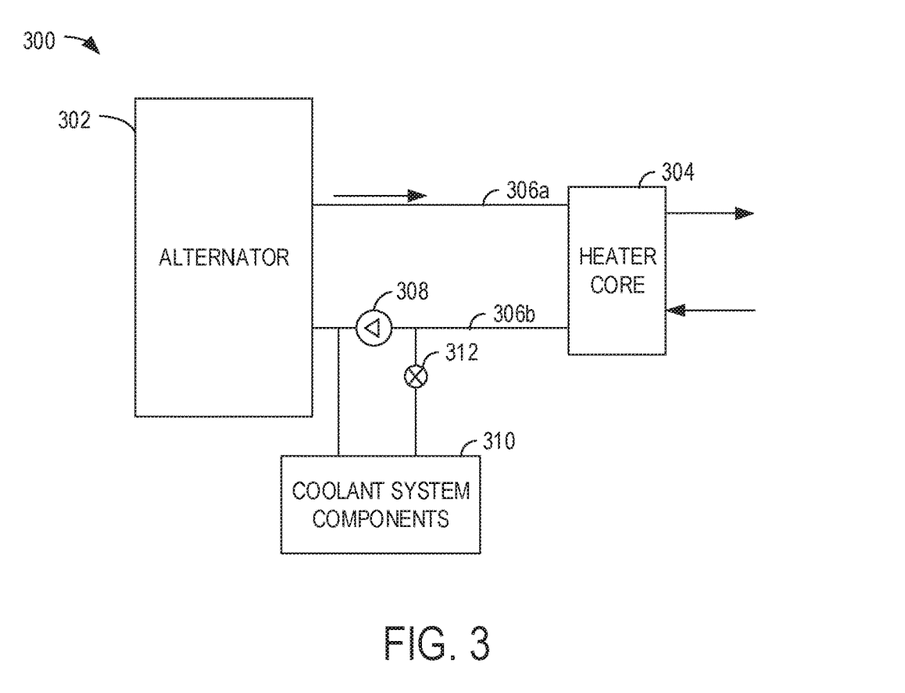
FIG. 3 schematically shows an example coolant system including an alternator.

The following description relates to systems and methods for reducing delays in introducing hot air within a cabin of a vehicle using an alternator of the vehicle. FIG. 1 shows an example engine system including heat-generating components of a vehicle that may be used to provide heat for a cabin of the vehicle. As described above, cabin heating delays may be reduced by using an alternator as a heater that quickly heats up coolant used by a cabin heater. FIG. 2 focuses on example electrical connectivity for an alternator and related systems, as an alternator output may be shorted in order to provide increased heating efficiency. FIG. 3 shows example coolant plumbing that enables the alternator to provide heated coolant to the cabin heater with minimized heat and power losses. An example method for controlling an engine system to provide alternator-based cabin heating is shown in the flow chart of FIG. 4. Example operation of an engine system before, during, and after an instant hot air mode (e.g., an alternator-based cabin heating mode) is shown in FIG. 5, where electrical connectivity of the alternator, coolant flow (e.g., controlled via a coolant valve position), and coolant temperature is plotted over time.

FIG. 1 schematically shows aspects of an example engine system 100 including an engine 10 coupled in vehicle 102. In some examples, vehicle 102 may be a hybrid vehicle with multiple sources of torque available to one or more vehicle wheels 47. In other examples, vehicle 102 is a conventional vehicle with only an engine, or an electric vehicle with only electric machine(s). Although largely described in the context of a conventional vehicle (e.g., where only an engine provides torque to one or more vehicle wheels 47), the disclosed systems and methods may alternatively be used in a hybrid vehicle that utilizes both an engine and an electric machine(s) to provide torque to one or more vehicle wheels 47. For example, the disclosed system and methods may be employed in a hybrid vehicle in order to decrease a load on electrical components and/or in order to provide a backup heating mechanism when a battery state of charge is lower than a threshold. The threshold may be predetermined and/or dynamically selected based on an operating state or condition of the vehicle, such as a charge level that corresponds to an amount of battery usage for travelling a distance remaining for a current trip as determined by a navigation system for the vehicle, in a non-limiting example.

In the example shown, vehicle 102 includes engine 10 and an electric machine 52. Electric machine 52 may be a motor or a motor/generator. Engine 10 and electric machine 52 are connected via a transmission 48 to vehicle wheels 47 when one or more clutches 53 are engaged. In the depicted example, a first clutch 53 is provided between engine 10 and electric machine 52, and a second clutch 53 is provided between electric machine 52 and transmission 48. Controller 12 may send a signal to an actuator of each clutch 53 to engage or disengage the clutch, so as to connect or disconnect engine 10 from electric machine 52 and the components connected thereto, and/or connect or disconnect electric machine 52 from transmission 48 and the components connected thereto. Transmission 48 may be a gearbox, a planetary gear system, or another type of transmission. The powertrain may be configured in various manners including as a parallel, a series, or a series-parallel hybrid vehicle. In electric vehicle embodiments, battery 45 may be a traction battery that may deliver electrical power to electric machine 52 to provide torque to vehicle wheels 47. In some embodiments, electric machine 52 may also be operated as a generator to provide electrical power to charge a system battery 45, for example during a braking operation. It will be appreciated that in other embodiments, including non-electric vehicle embodiments, system battery 45 may be a typical starting, lighting, ignition (SLI) battery coupled to an alternator 46.

In the depicted embodiment, engine 10 is a boosted engine including multiple, staged boosting devices. Specifically, engine 10 includes a first boosting device staged upstream of a second boosting device. The configuration results in a first compressor 110 (of the first boosting device) being positioned in the engine intake passage 42 upstream of a second compressor 114 (of the second boosting device). In the present example, the first boosting device is an electric supercharger 13, while the second boosting device is a turbocharger 15.

Electric supercharger 13 includes first compressor 110 driven by electric motor 108. Specifically, the compressor fan is driven by power received from the electric motor along supercharger compressor shaft 80. Motor 108 is powered by an on-board energy storage device, such as system battery 45. During selected conditions, air may enter first compressor 110 when the opening of electric supercharger bypass valve (ESBV) 72 is decreased, thereby directing incoming air from the air box 112 through the bypass and the first compressor, where it is pressurized for delivery to the second compressor 114. Fresh air received at the compressor inlet of second compressor 114 is then compressed and introduced into engine 10. By increasing the opening of the ESBV 72, an increased amount of air may not enter bypass 70, continuing instead to the second compressor 114 without having passed through the first compressor 110. During conditions when the ESBV is opened, compressed air may be delivered to engine 10 via second compressor 114 of the turbocharger only. In some examples, first compressor 110 of supercharger 13 may additionally be driven by the engine crankshaft, via a clutch and gear mechanism.

Turbocharger 15 includes second compressor 114 driven by a turbine 116. Second compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), where turbine geometry is actively varied as a function of engine operating conditions. Fresh air is introduced along intake passage 42 into engine 10 via air box 112 and flows to second compressor 114. During selected conditions, as elaborated below, air compressed by turbocharger 15 may be recirculated from the outlet to the inlet of second compressor 114 through second compressor bypass 60 by adjusting the opening of a compressor recirculation valve (CRV) 62. CRV 62 may be a continuously variable valve and increasing the opening of the recirculation valve may include actuating (or energizing) a solenoid of the valve.

One or both of valves 62 and 72 may be continuously variable valves wherein a position of the valve is continuously variable from a fully closed position to a fully open position. Alternatively, compressor recirculation valve 62 may be a continuously variable valve while compressor bypass valve 72 is an on-off valve. In some embodiments, CRV 62 may be normally partially open during boosted engine operation to provide some surge margin. Herein, the partially open position may be a default valve position. Then, in response to the indication of surge, the opening of CRV 62 may be increased. For example, the valve(s) may be shifted from the default, partially open position towards a fully open position. A degree of opening of the valve(s) during those conditions may be based on the indication of surge (e.g., the compressor ratio, the compressor flow rate, a pressure differential across the compressor, etc.). In alternate examples, CRV 62 may be held closed during boosted engine operation (e.g., peak performance conditions) to decrease boost response time and increase peak performance.

Second compressor 114 is coupled, through charge-air cooler (CAC) 18 (herein also referred to as an intercooler) to throttle valve 20. Throttle valve 20 is coupled to engine intake manifold 22. Air is received at the second compressor from first compressor 110. From the second compressor, the compressed air charge flows through the charge-air cooler 18 and the throttle valve to the intake manifold. The charge-air cooler may be an air-to-air or water-to-air heat exchanger, for example. In the embodiment shown in FIG. 1, the pressure of the air charge within the intake manifold is sensed by manifold air pressure (MAP) sensor 124.

It will be appreciated that, as used herein, first compressor refers to the upstream of the staged compressors and second compressor refers to the downstream of the staged compressors. In one non-limiting example, as depicted, the second downstream compressor is a turbocharger compressor while the first upstream compressor is a supercharger compressor. However, other combinations and configurations of boosting devices may be possible.

Alternator 46 may be configured to charge battery 45 using engine torque drawn from the crankshaft during engine running. In addition, alternator 46 may power one or more electrical systems of the engine, such as one or more auxiliary systems including a heating, ventilation, and air conditioning (HVAC) system, vehicle lights, an on-board entertainment system, as well as electric motor 108 coupled to supercharger compressor 110, based on their corresponding electrical demands. In one example, a current drawn on the alternator may continually vary based on each of operator cabin cooling demand, battery charging requirement, other auxiliary vehicle system demands, and motor torque. A voltage regulator may be coupled to alternator 46 in order to regulate the power output of the alternator based upon system usage requirements, including auxiliary system demands. Furthermore, the amount of electrical power delivered to the electric motor coupled to the supercharger may be varied in order to adjust the duty cycle of the supercharger. In one example, the electric power to the supercharger compressor motor may be increased to increase the speed of the compressor to increase boost pressure, with a corresponding increase in the electrical load applied on the alternator, and a decrease in alternator current.

The electrical supercharger may be periodically diagnosed, such as for electrical and/or mechanical degradation. One possible manifestation of supercharger degradation may result in internal components within the electric supercharger not spinning as freely as designed, thereby lowering the efficiency of the electric supercharger. Specifically, this means the electrical supercharger may draw more electrical power to realize the same relative increase in pressure for a particular airflow. The inventors herein have recognized that while directly measuring the electrical usage of the electrical motor may or may not be difficult, the electrical usage of the motor may be inferred from its effect on the total vehicle current. In particular, a change in alternator current may monitored as motor usage is varied, and used to infer the electrical power usage and electrical efficiency of the supercharger motor. As such, the electrical usage of the motor can become confounded due to the alternator having other electrical loads on it which are continuously varying. Consequently, the change in total vehicle current cannot be assumed to be due exclusively to the supercharger. However, by applying multiple step-changes in supercharger command, and measuring the change in total vehicle current for each step, the effect of the motor can be isolated from the effect of the other electrical loads on the alternator current, and then that measurement can be used to gauge supercharger efficiency. For example, as described with reference to FIG. 3, during selected engine idling conditions, the controller may increase the opening of the bypass valve to reduce a differential pressure across the first compressor. Then, the controller may command the supercharger motor 108 to undergo several step-wise changes while the controller monitors the supercharger speed and the alternator current. By comparing the actual change in compressor speed and alternator current to an expected change based on the step-wise commands, it may be determined whether the electric supercharger is degraded.

Returning to FIG. 1, engine torque may be transferred to vehicle wheels 47 via powertrain shaft 84. Specifically, engine torque may be relayed from crankshaft 40 to transmission 48, and thereon to wheels 47. Transmission 48 may be a fixed ratio transmission including a plurality of gear ratios to allow engine 10 to rotate at a different speed than wheels 47. As previously mentioned, clutch 53 may be provided between engine crankshaft 40 and transmission 48. By changing a torque transfer capacity of the clutch (e.g., an amount of clutch slippage), an amount of engine torque relayed to the wheels via the powertrain shaft may be modulated.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through waste-gate 90, by-passing the turbine. Waste-gate actuator 92 may be actuated open to dump at least some exhaust pressure from upstream of the turbine to a location downstream of the turbine via waste-gate 90. By reducing exhaust pressure upstream of the turbine, turbine speed can be reduced.

The combined flow from the turbine and the waste-gate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap NOx from the exhaust flow when the exhaust flow is lean, and to reduce the trapped NOx when the exhaust flow is rich. In other examples, an exhaust after-treatment catalyst may be configured to disproportionate NOx or to selectively reduce NOx with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, some exhaust may be diverted instead to the intake passage via an EGR passage (not shown) including an EGR cooler and an EGR valve. EGR may be recirculated to the inlet of first compressor 110, second compressor 114, or both.

One or more sensors may be coupled to an inlet of second compressor 114 (as shown) and/or first compressor 110 (not shown). For example, a temperature sensor 55 may be coupled to the inlet for estimating a compressor inlet temperature. As another example, a pressure sensor 56 may be coupled to the inlet for estimating a pressure of aircharge entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the aircharge recirculated from upstream of the CAC. One or more sensors may also be coupled to intake passage 42, upstream of first compressor 110, for determining a composition and condition of aircharge entering the compressor. These sensors may include, for example, manifold air flow sensor 57, and a barometric pressure sensor 58. In addition, a throttle inlet pressure (TIP) sensor 59 may be coupled downstream of the CAC and upstream of throttle valve 20 for estimating a boost pressure delivered to the engine.

During an operator tip-in event, when going from engine operation without boost to engine operation with boost responsive to an increase in operator torque demand, turbo lag can occur. This is due to delays in turbine spin-up and reduced flow through second compressor 114 when the throttle valve opens at the tip-in. The same may also occur when the engine is operating boosted and there is a transient increase in boost demand due to an increase in accelerator pedal application by the vehicle operator. To reduce this turbo lag, during those selected conditions, both supercharger 13 and turbocharger 15 may be enabled. Specifically, responsive to the tip-in, the waste-gate actuator 92 may be closed (e.g., fully closed) to increase exhaust flow through turbine 116. While turbine 116 spins-up, boost pressure can be transiently provided by upstream supercharger compressor 110. Enabling the supercharger includes drawing energy from battery 45 to spin motor 108, to thereby accelerate first compressor 110. In addition, bypass valve 72 may be closed (e.g., fully closed) so as to enable a larger portion of intake air to be flowed through and compressed by first compressor 110. In addition, CRV 62 may be closed (e.g., fully closed) so as to increase flow through downstream second compressor 114. When the turbine has sufficiently spun up, and is capable of driving second compressor 114, the first compressor may be decelerated by disabling motor 108 (by discontinuing flow of electrical energy to the motor from the battery 45). In addition, bypass valve 72 may be opened so as to enable a larger portion of air to bypass first compressor 110.

During an operator tip-out event, when going from engine operation with boost to engine operation without boost, or reduced boost, compressor surge can occur. This is due to a decreased flow through the second compressor 114 when the throttle valve closes at the tip-out. The reduced forward flow through the second compressor can cause surge and degrade turbocharger performance. In addition, surge can lead to NVH issues such as undesirable noise from the engine intake system. To enable the torque demand to be rapidly reduced responsive to the tip-out without incurring compressor surge during a default mode of vehicle operation, at least a portion of the aircharge compressed by second compressor 114 may be recirculated to the compressor inlet. This allows excess boost pressure to be substantially immediately relieved. In particular, compressor recirculation valve 62 may be opened to recirculate (warm) compressed air from the compressor outlet of second compressor 114, upstream of charge-air cooler 18 to the compressor inlet of second compressor 114. In some embodiments, the compressor recirculation system may alternatively, or additionally, include a recirculation passage for recirculating (cooled) compressed air from the compressor outlet, downstream of the charge-air cooler to the compressor inlet. In addition, waste-gate actuator 92 may be moved to a more open (e.g., fully open) position so that more of the exhaust flow travels to the tailpipe while bypassing the turbine, thereby expediting turbine spin-down.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the turbine, MAP sensor 124, exhaust temperature sensor 128, exhaust pressure sensor 129, compressor inlet temperature sensor 55, compressor inlet pressure sensor 56, MAF sensor 57, BP sensor 58, and TIP sensor 59. Other sensors such as additional pressure, temperature, air/fuel ratio, and composition sensors may be coupled to various locations in engine system 100. The actuators 81 may include, for example, throttle valve 20, compressor recirculation valve 62, compressor bypass valve 72, electric motor 108, waste-gate actuator 92, and fuel injector 66. The control system 14 may include a controller 12.

The controller 12 may receive input data from the various sensors, process the input data, and employ the various actuators based on the received signals and instructions stored on a memory of the controller. The controller may employ the actuators in response to the processed input data based on instruction or code programmed therein corresponding to one or more routines, such as example control routines described herein with regard to FIG. 4. As an example, responsive to an instant hot air mode being entered, the controller may send a signal to a switching circuit (e.g., a contactor) and/or to power electronics to short an alternator or rectifier output to ground. In addition, the controller may send a signal to an actuator of a coolant valve to actuate the coolant valve to a closed position that enables coolant heated by the alternator to flow only to a heater core of a cabin heater (e.g., closing a coolant circuit between the alternator and the heater core off from other components of coolant systems of the vehicle).

In this way, the components of FIG. 1 enables an engine system of a vehicle comprising an alternator electrically connectable to one or more electrical components of the engine system and fluidically connected to an alternator coolant circuit, a cabin heater including a heater core fluidically connected to the alternator coolant circuit, and a controller. The controller may be configured with computer readable instructions stored on non-transitory memory that, when executed during a first operating mode, cause the controller to short an alternator output of an alternator of the vehicle to ground, and close a coolant valve positioned between a coolant system of an engine of the engine system and the alternator coolant circuit. In a further example, the computer readable instructions may be executed to cause the controller to operate in the first operating mode responsive to detecting a request for cabin heating within a threshold period of time of a cold-start of the engine, and to operate in a second operating mode responsive to detecting an end to the first operating mode, the second operating mode including connecting the alternator output to an electrical load and opening the coolant valve positioned between the coolant system and the alternator coolant circuit.

FIG. 2 schematically shows an example portion of a vehicle electrical system 200 including an alternator 202 and associated electrical connections of the alternator. Alternator 202 may be an example of alternator 46 of FIG. 1. As described above, an alternator, such as alternator 202, may be used to charge a vehicle battery and/or power one or more electrical systems of a vehicle (e.g., using engine torque drawn from the crankshaft during an engine running state). In the illustrated example electricity generation operating state, the alternator 202 has a three-phase output (e.g., Phase A, Phase B, and Phase C), which are each coupled to alternator rectification component 204. Alternator rectification component 204 may be a rectifier that converts the alternating current output of the alternator 202 to direct current output (e.g., at terminal 206). For example, the rectification component 204 may provide a 12 volt rectified output at terminal 206. The terminal 206 may be connected to one or more electrical systems of a vehicle and/or a vehicle battery. In this way, when connected to the rectifier, the alternator 202 may produce electricity that charges the vehicle battery and/or that powers the one or more electrical systems.

In an alternative, heat generation operating state (relative to the operating state in which the alternator is connected to supply power to the rectifier and vehicle components), the alternator 202 and/or the output of the alternator rectification element 204 may be shorted to ground in order to produce heat instead of electricity. For example, a contactor 208 (e.g., an electrically-controlled switch and/or a relay) may be used to short the alternator 202 to ground (e.g., by activating switches 210a, 210b, and 210c). In other examples, power electronics may be used to ground the alternator output. In examples where the alternator rectification element output is grounded instead of the alternator output, the rectification element may be configured to handle increased amperage during the grounding (e.g., 400+ A in examples where the alternator rectification element is configured to provide a 12 V output). By shorting the alternator output (or rectification element output) to ground, the alternator efficiency may be reduced to 0%, thereby turning the alternator into a substantially 100% efficient heater.

In the above example, the alternator may be shorted to ground through 0.0 ohm resistors. In other examples, 0.1 ohm or 0.2 ohm resistors may be used (e.g., positioned between the alternator and the ground connection to which the alternator is shorted) instead of the 0.0 ohm resistors in order to set an alternator power level. Additional controls may be performed to adjust alternator operation during a heating operating mode. For example, the alternator may be controlled to increase an alternator field to a target level that produces maximum heat without exceeding a durability threshold of the alternator. In some examples, a DC-to-DC convertor may be used to raise a voltage of the field (and thus a current of the field and a magnetic field strength of the field) above the 12 V that is available under other conditions. As another example, when a vehicle transmission is in neutral or park, the engine speed may be raised to reduce alternator torque for a given power level. For example, if the engine turns at 600 RPM, the alternator turns at 1800 RPM, or 188 rad/s, providing a torque of 26.5 Nm at 5 kilowatts (5000/188=26.5 Nm). The engine speed and/or belt configuration of the vehicle may be adjusted to reduce belt squeal arising from the above control (e.g., engine speed may be increased or a toothed belt may be used to reduce belt squeal).

In order to route the heat generated by the alternator to a vehicle cabin, the alternator may be plumbed directly into a coolant circuit for the vehicle. FIG. 3 schematically shows an example vehicle coolant system 300 including an alternator 302. Alternator 302 may be an example of alternator 202 of FIG. 2 and/or alternator 46 of FIG. 1. For example, FIG. 3 may show coolant system connections for an alternator (e.g., alternator 302) that is electrically connected to vehicle systems as described above with respect to FIG. 2.

As shown in FIG. 3, alternator 302 is coupled to heater core 304 via coolant line 306a. In this way, coolant line 306a may flow heated coolant (e.g., coolant heated via the alternator while the alternator is operated in the heat generation operating state) from the alternator 302 to the heater core 304. Heater core 304 may be a heater core for a vehicle cabin heating system. For example, heater core 304 may output heat (e.g., heated air, which is heated via heated coolant that enters the heater core) to a venting system of a vehicle in order to heat a cabin of the vehicle. The heater core may take in cool air (e.g., from the cabin and/or another air intake source) to further cool the coolant cycled through the heater core. Pump 308 may pump coolant (e.g., cooled coolant) back to alternator 302 from the heater core 304 via coolant line 306b. The coolant from coolant line 306b may be heated via alternator 302, and then output as heated coolant back to the heater core 304 via coolant line 306a.

Additional coolant system components may be selectively coupled to the coolant circuit between alternator 302 and heater core 304 (e.g., an alternator coolant circuit, which may include the alternator 302, the heater core 304, and the coolant lines 306a and 306b extending therebetween). For example, coolant system components 310 may include a radiator, engine, and/or other systems of the vehicle connected to one or more coolant circuits to provide heat exchange capabilities throughout the vehicle. The coolant system components 310 may be selectively connected to the coolant line 306b via a valve 312. Valve 312 may enable the heater core to capture all of the heat from the liquid-cooled alternator without having to share that heat with the balance of the rest of the cooling system (e.g., the other coolant system components 310). By closing the valve 312 during an instant hot air operating mode, the alternator is isolated to the heater core loop, thus avoiding heat loss to the engine and/or other components. Later, after the instant hot air mode is ended, the valve may be opened. The valve 312 may be controlled to be opened or closed based on the operating mode (e.g., closed during the instant hot air operating mode and/or responsive to entering the instant hot air mode, and opened when not in the instant hot air operating mode and/or responsive to exiting the instant hot air operating mode). In this way, the alternator may be provided with the coldest available coolant to minimize power losses (e.g., to maximize an amount of heat from the alternator that is able to be used to heat the coolant).

The valve 312 may additionally or alternatively be controlled to be opened or closed based on a temperature of the coolant (e.g., the coolant exiting the alternator and/or the coolant entering the alternator). This coolant temperature-based control may only be performed during the instant hot air operating mode (e.g., where the valve is controlled to remain open while not in the instant hot air operating mode) and/or may be performed during any suitable mode. For example, the valve may be opened responsive to detecting (e.g., via a coolant temperature sensor positioned in coolant line 306a and/or 306b) that the temperature of the coolant is hotter than a target temperature. The target temperature may be associated with a requested cabin temperature (e.g., the target temperature may be a function of the requested cabin temperature and/or a current temperature of the cabin) and/or a requested amount of heat to provide to the cabin. For example, the targeted temperature may be selected to be a minimum temperature of the coolant exiting the alternator that is able to maintain a cabin temperature at a requested cabin temperature (e.g., without significant temperature loss in the cabin, such as maintaining the cabin temperature to within 1 degree of the requested cabin temperature). In another example, the target temperature may be selected to be a maximum temperature of the coolant exiting the heater core that is able to be further heated by the alternator or that is able to be further heated without wasting any power of the alternator. By opening the valve, excess heat in the alternator coolant circuit may be used to warm up the engine. In another example, the target temperature may correspond to a boiling temperature at a given pressure (e.g., a pressure in the coolant system and/or coolant lines carrying the coolant to and/or from the alternator and/or heater core). In this way, the instruction to open the valve when the temperature of the coolant is approaching (e.g., within a threshold range of, such as within 1% or 2% of) the boiling temperature may prevent the coolant from reaching that boiling temperature. In any of the above examples, the engine coolant (e.g., the coolant exiting the engine) may be prevented from mixing with the alternator-heated coolant when the engine coolant is cooler than the heater core outlet (e.g., the coolant exiting the heater core). The valve may be controlled to remain closed when the bulk of the engine coolant is below a target temperature that will heat the cabin. The coolant set point (e.g., the temperature to which the alternator is instructed or allowed to heat the coolant) may be as hot as possible without boil-over.

Figure 4:
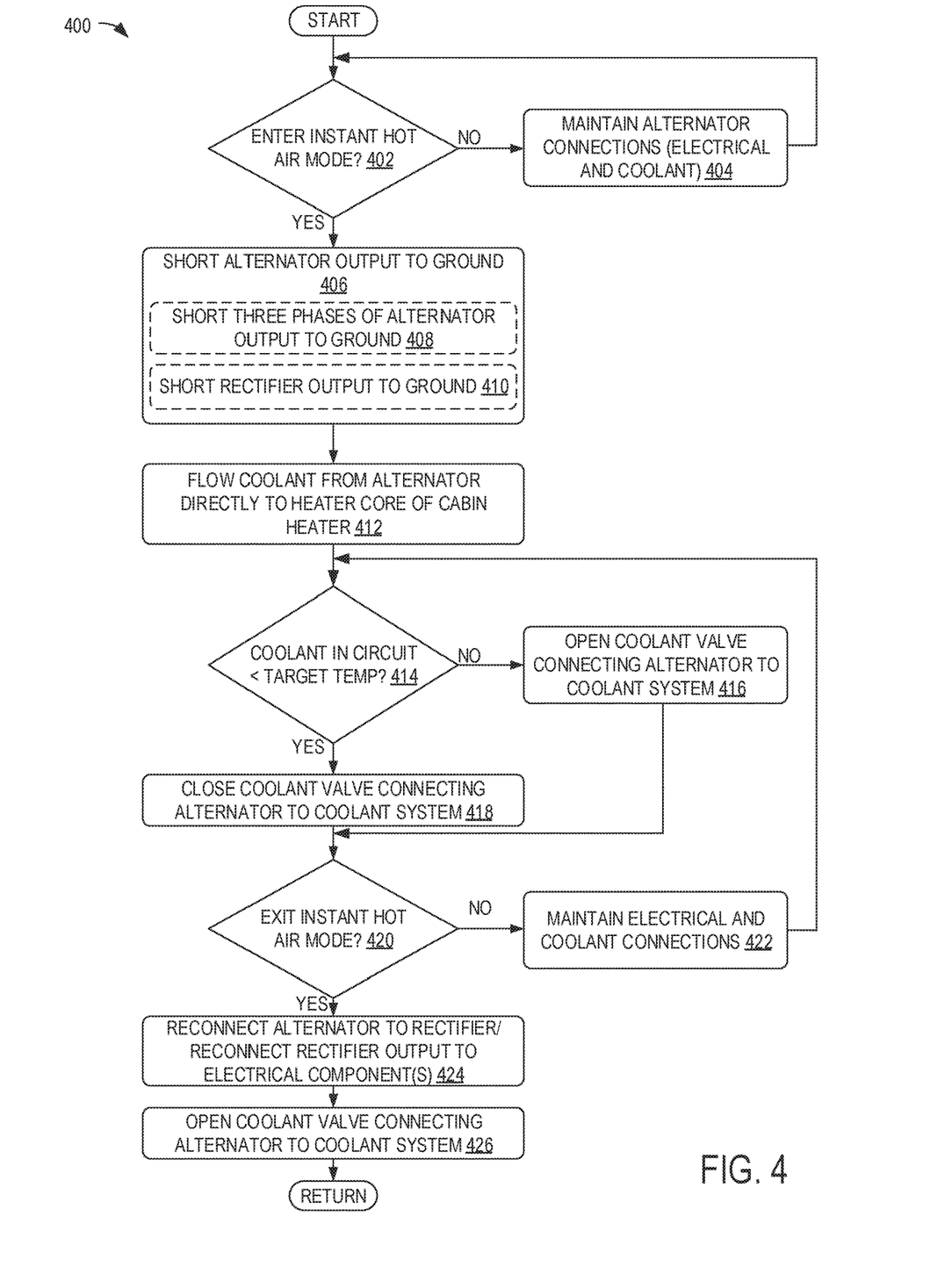
FIG. 4 is a flow chart of an example method for controlling an engine system to provide heating for a vehicle cabin.
Figure 5:
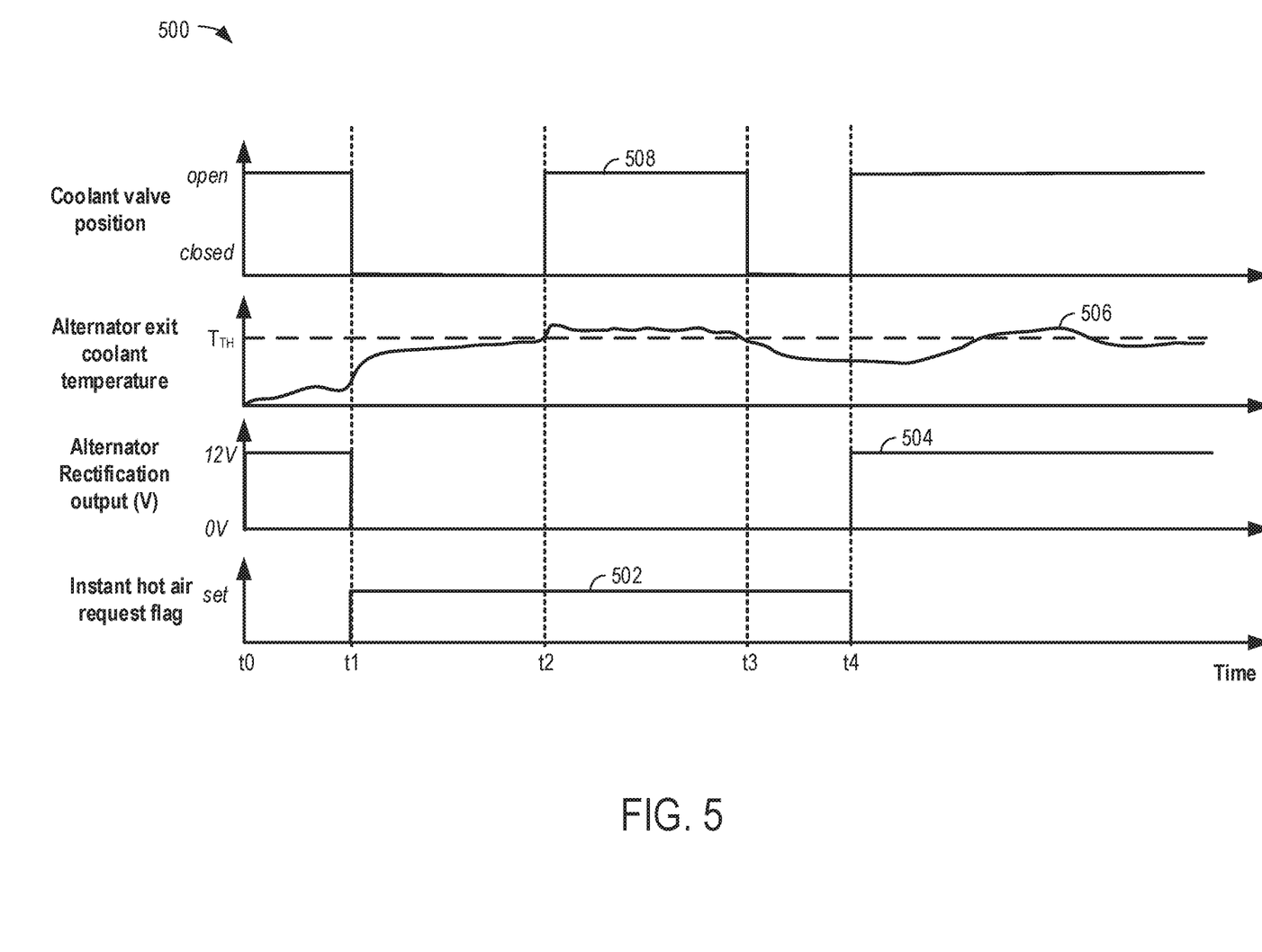
FIG. 5 is a timing diagram showing an example operation of an alternator and other components of an engine system over time.

FIG. 4 is a flow chart of an example method 400 for controlling an engine system to provide heating for a vehicle cabin. For example, instructions for carrying out method 400 and any other methods described herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 402, the method includes determining if an instant hot air mode is to be entered. For example, the instant hot air mode may be determined to be entered responsive to detecting a request for cabin heating (e.g., a user request routed via a climate control system of the vehicle to a controller of the vehicle) within a threshold period of time of starting the engine (e.g., the threshold period of time corresponding to a warm-up time to heat up engine components). If the instant hot air mode is not detected to be entered (e.g., "NO" at 402), the method includes maintaining alternator connections (e.g., electrical and coolant connections), as indicated at 404, and returning to continue monitoring for an entry into the instant hot air mode. If the instant hot air mode is detected to be entered (e.g., "YES" at 402), the method includes shorting the alternator to ground, as indicated at 406. Shorting the alternator to ground may include shorting an alternator output (e.g., a three-phase output of the alternator) to ground, as indicated at 408, or shorting a rectifier output to ground, as indicated at 410. In some examples, if the engine coolant has already substantially reached an associated target temperature, the controller may generate instructions (e.g., to the alternator) to disallow further heating of engine coolant via intentional alternator heating. It is to be understood that the instant hot air mode (e.g., an alternator heating mode) may not be entered or may be overridden and the alternator may not be used to heat cabin air even if the user requests heat in some conditions, such as when the vehicle is in an economy mode (e.g., a user has selected an economy setting) in which fuel economy is of greater concern than instant heat.

At 412, the method includes flowing coolant from the alternator directly to a heater core of the cabin heater. For example, a coolant valve connecting the alternator to an engine coolant system (e.g., coolant valve 312 of FIG. 3) may be closed responsive to entering the instant hot air mode, thereby isolating the coolant to only flowing between the alternator and the heater core of the cabin heater. At 414, the method includes determining whether coolant in an alternator coolant circuit (e.g., coolant exiting the alternator or coolant entering the alternator) is less than a target temperature. If the coolant in the circuit is above than the target temperature (e.g., the coolant in the circuit is greater than the target temperature, "NO" at 414), the method includes opening a coolant valve (or maintaining the coolant valve position if the coolant valve is already opened) connecting the alternator to an engine coolant system, as indicated at 416. Opening the valve at 416 enables the coolant to be flowed through remaining components of the cooling system of the vehicle when the coolant is hot enough to support such heat transfer. If the coolant in the circuit is less than the target temperature (e.g., "YES" at 414), the method includes closing the coolant valve (or maintaining the coolant valve position if the coolant valve is already closed) connecting the alternator to the coolant system, as indicated at 418. In this way, the coolant heated by the alternator may be isolated to only be directed to the heater core. In some examples, one or more components of the coolant system may be provided on different coolant circuits connected to the alternator coolant circuit by one or more different valves to enable selective routing of coolant heated by the alternator to the different components. The controller may make a logical determination (e.g., regarding a position of the coolant valve, such as coolant valve 312 of FIG. 3) based on logic rules that are a function of one or more parameters (e.g., coolant temperature in one or more of the above coolant circuits as measured by an associated temperature sensor positioned in the coolant circuit, current cabin temperature as measured by an associated temperature sensor positioned in the cabin, requested cabin temperature as determined based on user input, engine temperature as measured by an engine temperature sensor, ambient temperature as measured by an associated temperature sensor positioned in an environment of the vehicle, and/or other engine parameters such as engine load, throttle position, air flow, engine speed, etc. as measured by associated sensors). The controller may then generate a control signal that is sent to an actuator to adjust the position of the coolant valve (e.g., to close the coolant valve).

Once the coolant valve position is controlled and/or maintained at 416 or 418, the method includes determining if the instant hot air mode is to be exited, as indicated at 420. For example, the instant hot air mode may be determined to be exited responsive to detecting user input requesting a decrease in cabin heating. For example, the decrease in cabin heating may correspond to a decrease to below a threshold heating and/or temperature, the threshold heating and/or temperature being selected to correspond to an amount of heating that the engine coolant circuit is able to provide due to a temperature of the engine at the time of the requested decrease. In other examples, the instant hot air mode may be determined to be exited responsive to detecting that a temperature of an engine or other component of a coolant system is higher than a threshold (e.g., the threshold corresponding to an amount of heat output by the engine to a coolant circuit that is capable of maintaining or increasing a temperature of the cabin). In still other examples, the instant hot air mode may be determined to be exited responsive to an expiration of a timer or similar time-based mechanism (e.g., where the instant hot air mode is assigned a predetermined time of operation that is selected by a user and/or determined as a function of vehicle operating parameters and/or historical operating conditions).

Responsive to determining that the instant hot air mode is not to be exited (e.g., "NO" at 420), the method includes maintaining current electrical and coolant connections (e.g., maintaining an open or closed coolant valve and maintaining shorted electrical connections of the alternator and/or rectifier output), as indicated at 422, and returning to check the temperature of the coolant in the circuit at 414. Responsive to determining that the instant hot air mode is to be exited (e.g., "YES" at 420), the method includes reconnecting the alternator to the rectifier and/or reconnecting the rectifier output to electrical components, as indicated at 424. In this way, the alternator may be transitioned from primarily generating heat to primarily generating electricity. At 426, the method includes opening the coolant valve (or maintaining an open position of the coolant valve if the coolant valve is already opened) connecting the alternator to the coolant system. In some examples, the opening of the coolant valve may be performed selectively based on the temperature of the cabin, a requested temperature of the cabin (e.g., a difference between the requested temperature of the cabin and the actual temperature of the cabin), the temperature of the coolant in the coolant circuits of the vehicle, the temperature of the engine, and/or other parameters. For example, the opening of the coolant valve may be delayed until the engine temperature reaches a threshold temperature, the threshold temperature corresponding to a temperature that is greater than a current cabin temperature when the requested cabin temperature is higher than the current cabin temperature. In other examples, the coolant valve may be opened responsive to or immediately before reconnecting the electrical connections of the alternator at 424. After opening the coolant valve, heat from the engine and/or other components of the coolant system may be used to heat the cabin of the vehicle. For example, during the instant hot air mode, the alternator may provide the majority of heat used to heat the cabin of the vehicle, whereas after the instant hot air mode (e.g., after the electrical and coolant connections are readjusted at 424/426), the engine components may provide the majority of heat used to heat the cabin of the vehicle.

As illustrated by examples herein, the method of operating and performing actions responsive to a determination of a condition may include operating in that condition (e.g., operating in an instant hot air mode, flowing coolant that has a temperature higher than or lower than a target temperature, etc.), determining whether that condition is present (such as based on sensor output, e.g., determining that the coolant in the circuit has a temperature that is higher than or lower than a target temperature based on one or more temperature sensors in the coolant circuit) and performing actions in response thereto, as well as operating without that condition present, determining that the condition is not present, and performing a different action in response thereto.

FIG. 5 is a timing diagram 500 showing an example operation of an alternator and other components of an engine system of a vehicle over time. For example, timing diagram 500 may represent an example operation of the alternator 202 and/or 302 of FIGS. 2 and 3 and related components during operation of method 400 of FIG. 4. Timing diagram 500 includes a plot 502 of an instant hot air request flag, which may represent an indicator of whether the vehicle is operating in an instant hot air mode (e.g., when "set," the vehicle is operating in an instant hot air mode, otherwise the vehicle is not operating in an instant hot air mode). The diagram also includes a plot 504 of an alternator rectification output (e.g., in volts). For example, an output of the alternator rectification element 204 of FIG. 2 may be represented by plot 504. Plot 506 shows example alternator exit coolant temperatures. For example, plot 506 may represent a temperature of coolant exiting alternator 302 of FIG. 3 (e.g., the temperature of the coolant in coolant line 306a of FIG. 3, which may be measured via one or more temperature sensors positioned in or around coolant line 306a). It is to be understood that in additional or alternative examples, similar operation may be experienced responsive to the temperature of coolant exiting a heater core (e.g., coolant in coolant line 306b exiting heater core 304 of FIG. 3, which may be measured via one or more temperature sensors positioned in or around coolant line 306b) of the vehicle corresponding to the plot 506. Plot 508 shows a position of a coolant valve (e.g., coolant valve 312 of FIG. 3) connecting a coolant circuit of an alternator and heater core (e.g., the coolant circuit formed by coolant lines 306a and 306b of FIG. 3) to other coolant system components (e.g., coolant system components 310 of FIG. 3).

As shown at time t0, an instant hot air request flag is not set, and an alternator rectification output is 12 volts. Time t0 may represent a time immediately after a cold start of an engine of the vehicle, thus the alternator exit coolant temperature is at a relative minimum (e.g., at an ambient temperature of the environment of the vehicle). The coolant valve position at time t0 is open, allowing coolant to flow from other coolant system components through the alternator and heater core. At time t1, the instant hot air request flag is switched to being set (e.g., responsive to a user requesting an instant hot air mode via a control in the vehicle). In response, at time t1, the alternator rectification output drops to 0 volts as a result of the alternator output and/or alternator rectification output being shorted to ground (e.g., as described at 406 of method 400 in FIG. 4). The shorting of the electrical connections of the alternator results in a sharp increase in temperature of coolant exiting the alternator, as the alternator is transitioned to a substantially 100% efficient heater. The coolant valve position is commanded (e.g., via a controller) to close at time t1. The coolant valve position is switched from an open position to a closed position in order to concentrate the flow of hot coolant from the alternator to the cabin heater core to heat the cabin of the vehicle as quickly as possible.

At time t2, the alternator exit coolant temperature rises above a threshold temperature, represented by the line at $T_{TH}$. As described at 414 of FIG. 4, the increase in temperature of the alternator exit coolant to above the threshold causes the coolant valve to be switched from the closed position to an open position (e.g., causes the coolant valve to be commanded open by a controller of the vehicle) in order to allow coolant exiting the heater core of the cabin heater to flow through other components of the coolant system and to allow coolant exiting the other components of the coolant system to flow through the alternator. It is to be understood that the system may be controlled to reduce the likelihood that the condition at time t2 (e.g., where the coolant temperature rises above the threshold temperature) occurs by reducing the field current and the alternator heating before the temperature threshold is met. In some examples, the threshold temperature may be set to a temperature that is just under (e.g., less than and within 1% or 2% of) a max operating temperature (e.g., a boil-over temperature for a given pressure in the coolant system/coolant lines) such that the venting may be performed to prevent the coolant from reaching the max operating temperature.

At time t3, the temperature of the coolant exiting the alternator drops below the threshold, and the coolant valve is commanded to be closed again (e.g., in order to avoid heat losses to the other components of the coolant system). At time t4, the instant hot air mode flag is switched from being set to not being set (e.g., as described at the "YES" branch off of 420 of method 400 in FIG. 4). For example, time t1 through t4 may represent a predefined duration for the instant hot air mode, or a condition such as a user input or temperature parameter may cause the instant hot air mode to end at time t4 (e.g., a temperature of the cabin reaches a requested temperature, a temperature of the engine or of coolant exiting the engine reaches a threshold temperature, etc.). As a result of the end of the instant hot air mode, the alternator electrical connections that were shorted at time t1 are reconnected to electrical components, causing the output of the alternator rectification to return to 12 volts at time t4. The coolant valve is controlled to be open at time t4 to reconnect the coolant circuit of the alternator to the other components of the coolant system. As shown, the temperature exiting the alternator may increase even though the alternator is not producing as much heat after the instant hot air mode ends. The increase in temperature is due to the influx of hot coolant from the other components of the coolant system, connected to the alternator via the coolant valve (which is opened at time t4).

In this way, an alternator of a vehicle may be placed into a particular operating mode (e.g., in which the output of the alternator is shorted) that generates heat and little to no electrical power in order to quickly and efficiently heat a cabin of a vehicle (e.g., while an engine is still warming, such as after a cold-start of the vehicle). A technical effect of the above-described electrical shorting is that the shorted alternator is able to generate more heat for a given alternator relative to an alternator that generates both electricity and heat and relative to an alternator that generates electricity to power a heater (whereby energy generation efficiency losses are present). As described above, the coolant plumbing of the alternator provides further advantages in that a heater core of the cabin heater is provided with exclusive use of the alternator heat. A technical effect of the above-described coolant plumbing is that heat losses to the engine are reduced (e.g., removed), providing an increased heating capability for the cabin of the vehicle relative to systems that balance the cooling system by allowing alternator exit coolant to warm the engine.

For example, the coolant flowing through the alternator may, in a default mode (e.g., not the instant hot air or alternator heating mode) serve to reduce alternator temperature to make the alternator as efficient as possible in producing electricity. Thus, in the default mode (e.g., not instant hot air mode) the coolant system may be controlled to route the coldest coolant in the alternator. Typically, the coolest coolant would be radiator outlet coolant. During the above-described instant hot air mode, the objective may be changed to include providing maximum coolant heating for the purpose of cabin heating.

The above disclosure also provides for a method that includes operating in a first operating mode to heat a cabin of a vehicle, the first operating mode including shorting an alternator output of an alternator of the vehicle to ground, and closing a coolant valve positioned between a coolant system of an engine of the vehicle and an alternator coolant circuit, the alternator coolant circuit flowing coolant heated by the alternator to a heater core of a cabin heater of the vehicle. In a first example of the method, shorting the alternator output additionally or alternatively includes controlling a contactor to engage with the alternator to short a connection between the alternator and a rectifier, the rectifier providing a rectified voltage output for an electrical load when electrically connected to the alternator. A second example of the method optionally includes the first example, and further includes the method, wherein the electrical load comprises a battery that is recharged via the alternator output when electrically connected to the alternator. A third example of the method optionally includes one or both of the first example and the second example, and further includes the method, wherein the alternator output is connected to a rectifier, and wherein shorting the alternator output comprises controlling a contactor to engage with a rectifier to short a connection between the rectifier and an electrical load of the rectifier. A fourth example of the method optionally includes one or more of the first through the third examples, and further includes the method, further comprising operating in the first operating mode responsive to detecting a request for cabin heating within a threshold period of time of a cold-start of the engine, the method further comprising operating in a second operating mode responsive to detecting an end to the first operating mode, the second operating mode including connecting the alternator output to an electrical load and opening the coolant valve positioned between the coolant system and the alternator coolant circuit. A fifth example of the method optionally includes one or more of the first through the fourth examples, and further includes the method, wherein detecting the end to the first operating mode comprises detecting that an engine temperature of the engine or a coolant temperature of coolant exiting the engine is above a threshold temperature. A sixth example of the method optionally includes one or more of the first through the fifth examples, and further includes the method, wherein the first operating mode further includes determining that coolant in the alternator coolant circuit is above a threshold temperature and, responsive to determining that the coolant in the alternator coolant circuit is above the threshold temperature, opening the coolant valve positioned between a coolant system of an engine of the vehicle and an alternator coolant circuit. A seventh example of the method optionally includes one or more of the first through the sixth examples, and further includes the method, wherein the threshold temperature is selected based on a requested temperature for the cabin and/or a requested amount of heat to provide to the cabin. An eighth example of the method optionally includes one or more of the first through the seventh examples, and further includes the method, wherein the alternator coolant circuit includes a pump positioned between the heater core and the alternator, and wherein the first operating mode further includes pumping coolant from the heater core to the alternator via the pump.

The above disclosure also provides for an engine system of a vehicle including an alternator electrically connectable to one or more electrical components of the engine system and fluidically connected to an alternator coolant circuit, a cabin heater including a heater core fluidically connected to the alternator coolant circuit, and a controller with computer readable instructions stored on non-transitory memory that, when executed during a first operating mode, cause the controller to short an alternator output of an alternator of the vehicle to ground, and close a coolant valve positioned between a coolant system of an engine of the engine system and the alternator coolant circuit. In a first example of the engine system, the engine system further comprising a contactor and a rectifier, the rectifier providing a rectified voltage output for an electrical load when electrically connected to the alternator, and shorting the alternator output additionally or alternatively comprises controlling the contactor to engage with the alternator to short a connection between the alternator and the rectifier. A second example of the engine system optionally includes the first example, and further includes the engine system, wherein the electrical load comprises the battery, the battery being recharged via the alternator output when electrically connected to the alternator. A third example of the engine system optionally includes one or both of the first example and the second example, and further includes the engine system, further comprising a rectifier, the rectifier providing a rectified voltage output for an electrical load when electrically connected to the alternator, and wherein shorting the alternator output comprises controlling a contactor to engage with a rectifier to short a connection between the rectifier and an electrical load of the rectifier. A fourth example of the engine system optionally includes one or more of the first through the third examples, and further includes the engine system, further comprising operating in the first operating mode responsive to detecting a request for cabin heating within a threshold period of time of a cold-start of the engine, the instructions further causing the controller to operate in a second operating mode responsive to detecting an end to the first operating mode, the second operating mode including connecting the alternator output to an electrical load and opening the coolant valve positioned between the coolant system and the alternator coolant circuit. A fifth example of the engine system optionally includes one or more of the first through the fourth examples, and further includes the engine system, wherein detecting the end to the first operating mode comprises detecting that an engine temperature of the engine or a coolant temperature of coolant exiting the engine is above a threshold temperature. A sixth example of the engine system optionally includes one or more of the first through the fifth examples, and further includes the engine system, wherein the first operating mode further includes determining that coolant in the alternator coolant circuit is above a threshold temperature and, responsive to determining that the coolant in the alternator coolant circuit is above the threshold temperature, opening the coolant valve positioned between a coolant system of the engine and an alternator coolant circuit. A seventh example of the engine system optionally includes one or more of the first through the sixth examples, and further includes the engine system, wherein the threshold temperature is selected based on a requested temperature for the cabin and/or a requested amount of heat to provide to the cabin. An eighth example of the engine system optionally includes one or more of the first through the seventh examples, and further includes the engine system, wherein the alternator coolant circuit includes a pump positioned between the heater core and the alternator, and wherein the first operating mode further includes pumping coolant from the heater core to the alternator via the pump.

The above disclosure also provides for a method including operating in a first operating mode to heat a cabin of a vehicle with an alternator of the vehicle responsive to a request for cabin heating within a threshold period of time of an engine cold-start of the vehicle, the first operating mode including shorting an alternator output of an alternator of the vehicle to ground, and closing a coolant valve positioned between a coolant system of an engine of the vehicle and an alternator coolant circuit, the alternator coolant circuit flowing coolant heated by the alternator to a heater core of a cabin heater of the vehicle, and operating in a second operating mode to heat the cabin of the vehicle with the coolant system of the engine responsive to determining that coolant exiting the coolant system of the engine is greater than a threshold temperature, the second operating mode including connecting the alternator output of the alternator to an electrical load, and opening the coolant valve positioned between the coolant system of the engine of the vehicle and the alternator coolant circuit. In a first example of the method, connecting the alternator output to the electrical load may additionally or alternatively include connecting the alternator output to a rectifier, the rectifier providing a rectified alternator output to charge a battery of the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
operating in a first operating mode to heat a cabin of a vehicle, the first operating mode including:
shorting an alternator output of an alternator of the vehicle to ground;
closing a coolant valve positioned between a coolant system of an engine of the vehicle and an alternator coolant circuit, the alternator coolant circuit flowing coolant heated by the alternator to a heater core of a cabin heater of the vehicle; and operating in the first operating mode responsive to detecting a request for cabin heating within a threshold period of time of a cold-start of the engine, the method further comprising operating in a second operating mode responsive to detecting an end to the first operating mode, the second operating mode including connecting the alternator output to an electrical load and opening the coolant valve positioned between the coolant system and the alternator coolant circuit.

2. The method of claim 1, wherein shorting the alternator output comprises controlling a contactor to engage with the alternator to short a connection between the alternator and a rectifier, the rectifier providing a rectified voltage output for the electrical load when electrically connected to the alternator.

3. The method of claim 2, wherein the electrical load comprises a battery that is recharged via the alternator output when electrically connected to the alternator.

4. The method of claim 1, wherein the alternator output is connected to a rectifier, and wherein shorting the alternator output comprises controlling a contactor to engage with the rectifier to short a connection between the rectifier and an electrical load of the rectifier.

5. The method of claim 1, wherein detecting the end to the first operating mode comprises detecting that an engine temperature of the engine or a coolant temperature of coolant exiting the engine is above a threshold temperature.

6. The method of claim 1, wherein the first operating mode further includes determining that coolant in the alternator coolant circuit is above a threshold temperature and, responsive to determining that the coolant in the alternator coolant circuit is above the threshold temperature, opening the coolant valve positioned between the coolant system of an engine of the vehicle and an alternator coolant circuit.

7. The method of claim 6, wherein the threshold temperature is selected based on a requested temperature for the cabin and/or a requested amount of heat to provide to the cabin.

8. The method of claim 1, wherein the alternator coolant circuit includes a pump positioned between the heater core and the alternator, and wherein the first operating mode further includes pumping coolant from the heater core to the alternator via the pump.

9. An engine system of a vehicle comprising:
an alternator electrically connectable to one or more electrical components of the engine system and fluidically connected to an alternator coolant circuit;
a cabin heater including a heater core fluidically connected to the alternator coolant circuit; and
a controller with computer readable instructions stored on non-transitory memory that, when executed during a first operating mode, cause the controller to:
short an alternator output of the alternator of the vehicle to ground;
close a coolant valve positioned between a coolant system of an engine of the engine system and the alternator coolant circuit; and
operating in the first operating mode responsive to detecting a request for cabin heating within a threshold period of time of a cold-start of the engine, the instructions further causing the controller to operate in a second operating mode responsive to detecting an end to the first operating mode, the second operating mode including connecting the alternator output to an electrical load and opening the coolant valve positioned between the coolant system and the alternator coolant circuit.

10. The engine system of claim 9, further comprising a contactor and a rectifier, the rectifier providing a rectified voltage output for the electrical load when electrically connected to the alternator, wherein shorting the alternator output comprises controlling the contactor to engage with the alternator to short a connection between the alternator and the rectifier.

11. The engine system of claim 10, further comprising a battery, wherein the electrical load comprises the battery, the battery being recharged via the alternator output when electrically connected to the alternator.

12. The engine system of claim 9, further comprising a rectifier, the rectifier providing a rectified voltage output for the electrical load when electrically connected to the alternator, and wherein shorting the alternator output comprises controlling a contactor to engage with the rectifier to short a connection between the rectifier and an electrical load of the rectifier.

13. The engine system of claim 9, wherein detecting the end to the first operating mode comprises detecting that an engine temperature of the engine or a coolant temperature of coolant exiting the engine is above a threshold temperature.

14. The engine system of claim 9, wherein the first operating mode further includes determining that coolant in the alternator coolant circuit is above a threshold temperature and, responsive to determining that the coolant in the alternator coolant circuit is above the threshold temperature, opening the coolant valve positioned between the coolant system of the engine and the alternator coolant circuit.

15. The engine system of claim 14, wherein the threshold temperature is selected based on a requested temperature for the cabin and/or a requested amount of heat to provide to the cabin.

16. The engine system of claim 9, wherein the alternator coolant circuit includes a pump positioned between the heater core and the alternator, and wherein the first operating mode further includes pumping coolant from the heater core to the alternator via the pump.

17. A method comprising:
operating in a first operating mode to heat a cabin of a vehicle with an alternator of the vehicle responsive to a request for cabin heating within a threshold period of time of an engine cold-start of the vehicle, the first operating mode including:
shorting an alternator output of the alternator of the vehicle to ground, and
closing a coolant valve positioned between a coolant system of the engine of the vehicle and an alternator coolant circuit, the alternator coolant circuit flowing coolant heated by the alternator to a heater core of a cabin heater of the vehicle; and
operating in a second operating mode to heat the cabin of the vehicle with the coolant system of the engine responsive to determining that coolant exiting the coolant system of the engine is greater than a threshold temperature, the second operating mode including:
connecting the alternator output of the alternator to an electrical load, and
opening the coolant valve positioned between the coolant system of the engine of the vehicle and the alternator coolant circuit.

18. The method of claim 17, wherein connecting the alternator output to the electrical load comprises connecting the alternator output to a rectifier, the rectifier providing a rectified alternator output to charge a battery of the vehicle.

\* \* \* \* \*